United States Patent
Storey

(10) Patent No.: US 12,232,603 B2
(45) Date of Patent: Feb. 25, 2025

(54) ROTATABLE CONNECTOR

(71) Applicant: Treekit Limited, Wimborne (GB)

(72) Inventor: Michael T Storey, Wimborne (GB)

(73) Assignee: Sherrill, Inc., Greensboro, NC (US)

( * ) Notice: Subject to any disclaimer, the term of this patent is extended or adjusted under 35 U.S.C. 154(b) by 217 days.

(21) Appl. No.: 18/058,351

(22) Filed: Nov. 23, 2022

(65) Prior Publication Data
US 2023/0157440 A1     May 25, 2023

(30) Foreign Application Priority Data

Nov. 24, 2021 (GB) ...................... 2116932

(51) Int. Cl.
*A45F 5/10* (2006.01)
*A44B 15/00* (2006.01)
*A45F 5/00* (2006.01)

(52) U.S. Cl.
CPC ............ *A45F 5/102* (2013.01); *A44B 15/002* (2013.01); *A45F 2005/002* (2013.01); *A45F 2005/006* (2013.01)

(58) Field of Classification Search
CPC .. A45F 5/102; A45F 5/1046; A45F 2005/002; A45F 2005/006; A44B 15/002
See application file for complete search history.

(56) References Cited

U.S. PATENT DOCUMENTS

| | | | |
|---|---|---|---|
| 5,062,192 A * | 11/1991 | Sawyer | H02G 1/1229 81/9.41 |
| 5,261,257 A | 11/1993 | Collier | |
| 7,874,602 B2 * | 1/2011 | Meckwood | A45F 5/102 294/158 |
| 8,182,008 B2 * | 5/2012 | Meckwood | A45F 5/1046 294/158 |
| 9,775,427 B2 * | 10/2017 | Moreau | B25H 3/00 |
| 10,306,876 B2 * | 6/2019 | Jaramus | A01K 91/04 |
| 11,143,220 B2 * | 10/2021 | Betcher | F16B 2/10 |

(Continued)

FOREIGN PATENT DOCUMENTS

SE           543990 C2     10/2021

OTHER PUBLICATIONS

Search report for Appl No. GB2116932.1 dated May 23, 2022.
Extended European Search Report for Appl. No. 22209233 dated Apr. 18, 2023.

*Primary Examiner* — Christine M Mills
*Assistant Examiner* — Matthew J Sullivan

(57) ABSTRACT

A rotatable connector formed from two parts, each comprising a body extending from a connecting head having a first face and an opposed second face, the second face having an arcuate tail section on an outer perimeter edge and shaped to be received by a tail socket defined between the first face and a pin extending from a proximal end of the body. When the two parts are engaged, the connecting heads are coaxial to define an axis of rotation. When the parts are rotated on the axis relative to one another, the tail section of the first part travels through the tail socket of the second part and the tail section of the second part travels through the tail socket of the first part, thereby connecting the two parts together. When the parts are rotated in the opposite direction, the parts are disconnected from each other.

12 Claims, 4 Drawing Sheets

(56) References Cited

U.S. PATENT DOCUMENTS

| | | | |
|---|---|---|---|
| 11,659,920 B2* | 5/2023 | Werdowatz | A45F 5/1046 |
| | | | 294/142 |
| D1,036,981 S * | 7/2024 | LaPorte | D8/394 |
| 2003/0005797 A1* | 1/2003 | Hopper | B25B 5/06 |
| | | | 81/318 |
| 2007/0178732 A1 | 8/2007 | Kalifa et al. | |
| 2011/0179578 A1 | 7/2011 | Montross | |
| 2014/0178126 A1 | 6/2014 | Burns | |
| 2018/0177173 A1* | 6/2018 | Lohmiller | A01K 91/04 |
| 2023/0337788 A1* | 10/2023 | Filko | A44B 15/002 |

* cited by examiner

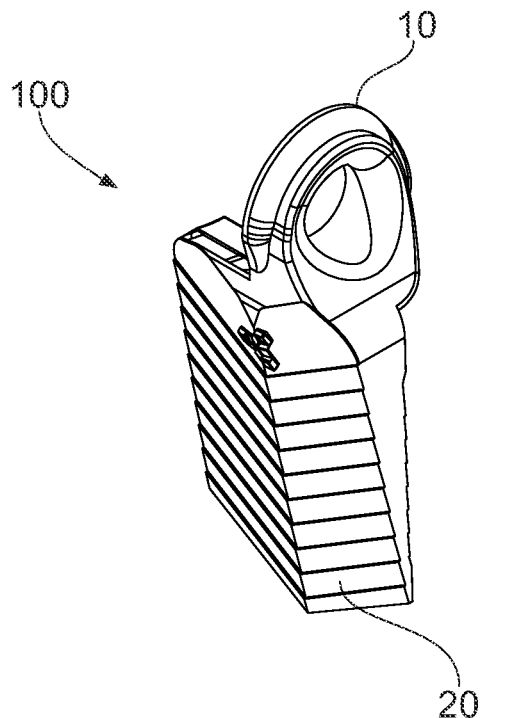
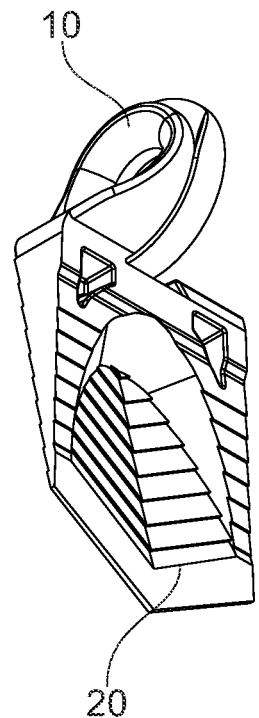
FIG. 1A  FIG. 1B
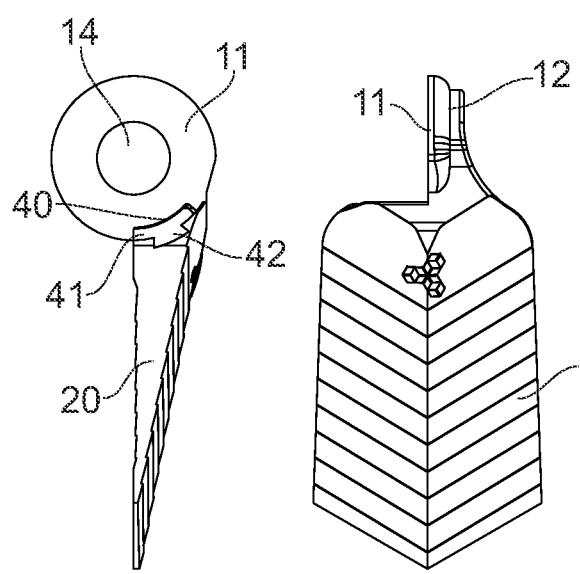
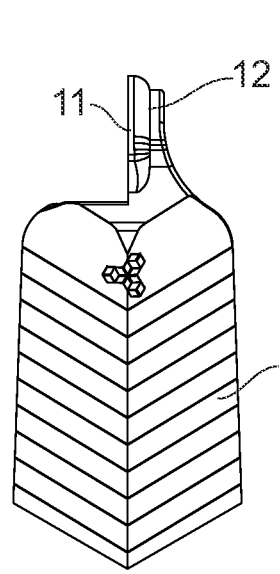
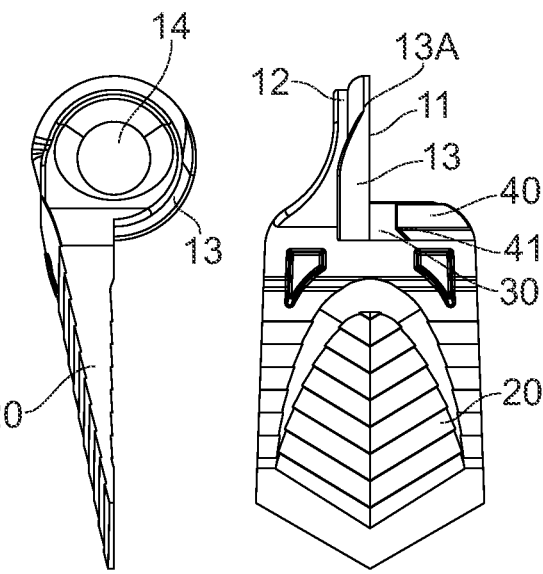
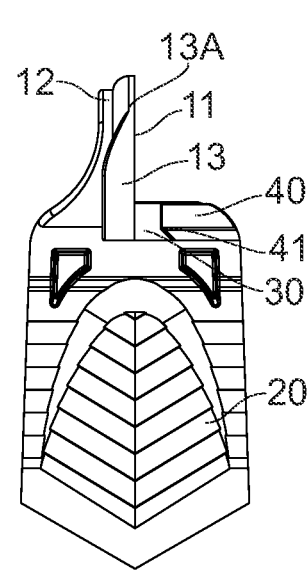
FIG. 1C  FIG. 1D  FIG. 1E  FIG. 1F

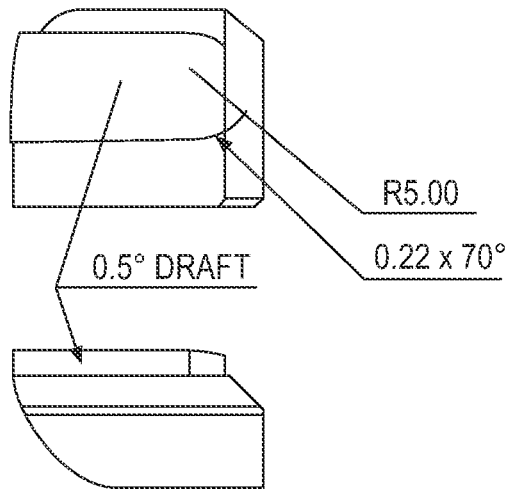
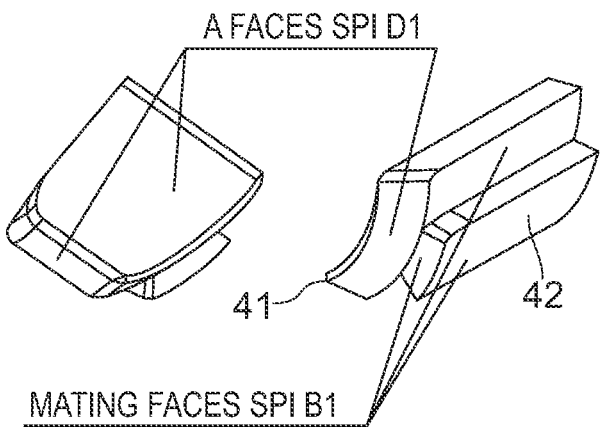
FIG. 3A  FIG. 3B
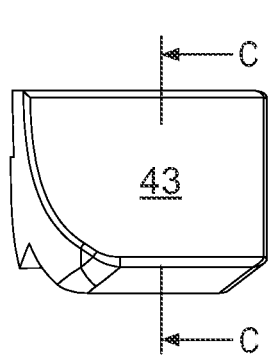
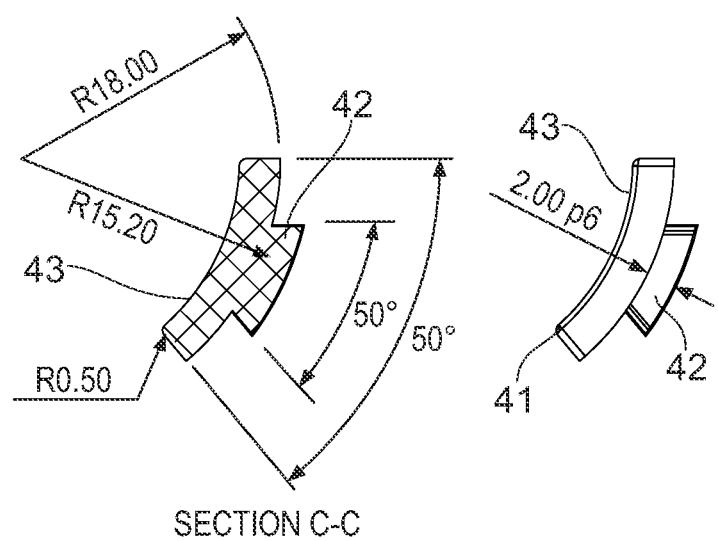
FIG. 3C

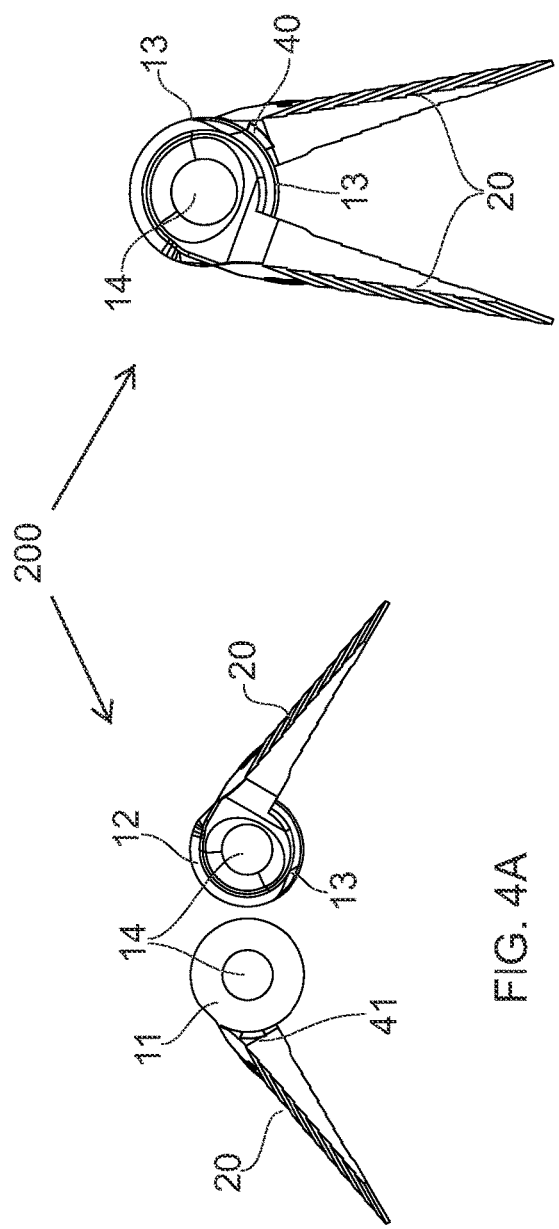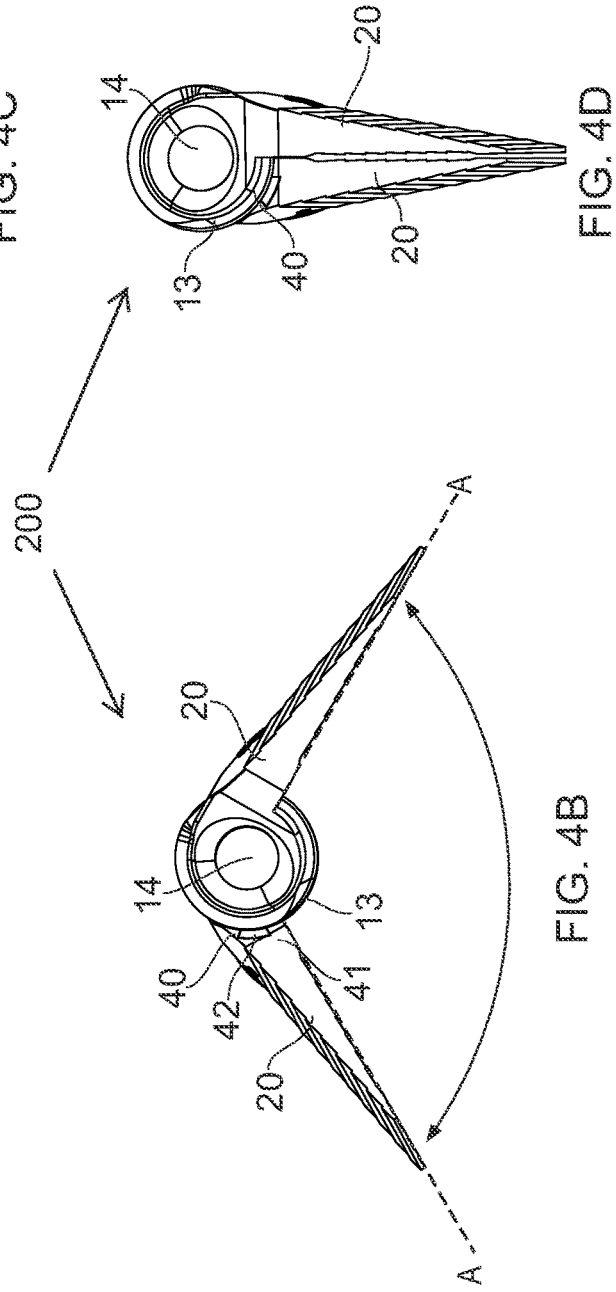

ROTATABLE CONNECTOR

STATEMENT REGARDING FEDERALLY SPONSORED RESEARCH OR DEVELOPMENT

Not Applicable

REFERENCE TO A SEQUENCE LISTING, A TABLE, OR A COMPUTER PROGRAM LISTING COMPACT DISK APPENDIX

Not Applicable

BACKGROUND OF THE INVENTION

1. Field of the Invention

The present invention relates to a rotatable connector for connecting and disconnecting two parts by using a rotating action.

2. Description of the Related Art

It is often necessary to carry a number of items at one time. Often the items are carried separately and used when required. However, when carrying multiple items, it may be difficult and/or take time to find a desired item. Furthermore, if working at height it is essential that carried items are tethered and therefore carrying multiple items all separately tethered may not be practical.

The present invention provides a quick and easy means to connect items for carrying, for efficient storage and enabling the items to be easily separated for use.

SUMMARY OF THE INVENTION

According to a first aspect of the present invention, there is provided a rotatable connector formed from two parts, each part comprising a body extending from a connecting head, wherein the connecting head has a first face and an opposed second face, the second faces of each part includes an arcuate tail section arranged on an outer perimeter edge of a segment of each connecting head, and each second face is shaped and dimensioned to be received, through a tail socket defined between the first face and a pin extending from a proximal end of the body, so that when the two parts are engaged, their two connecting heads are coaxial to define an axis of rotation, and when the two engaged parts are rotated relative one to another, the tail section of the first part travels through the tail socket of the second part and a tail section of the second part travels through a tail socket of the first part, thereby connecting the two parts together, and when the two parts are rotated in an opposite direction, the two parts are disconnected one from the other.

In this way the two parts can be connected and disconnected by a rotation action of each part with respect to the other.

The connection of two parts enables two or more items to be carried together and separated when required for use. It is appreciated that the body may be a useable part such as a wedge or tool, or may be an attachment point such as a ring for receiving items that may be depended from it.

In a preferred embodiment, the parts are identical. In this way manufacture is simplified, for example only one mold may be required, thus reducing manufacturing costs.

The first and second faces of the connecting head are adapted to enable alignment and connection between the two parts. In a preferred embodiment the first face is planar and provides an engagement surface at which both parts abut and rotate coaxially relative to each other during connection and disconnection of the parts. The first faces provide a guide for orientating and engaging the two parts so that they are aligned to enable connection and disconnection by means of the tail sections and tail sockets.

Preferably, the second face is a contoured face having raised and lowered regions that define the arcuate tail section that permits connection between the two parts when a tail section is received by a tail socket. The arcuate tail section on the second face is shaped and dimensioned to be received by and guided along the tail socket.

The tail section is on a perimeter edge of the second face and has a cross section that corresponds to the cross section of the tail socket.

In preferred embodiments, the tail section is tapered from a first end to a second end. In this way the first end is narrower and more easily received into the tail socket. Preferably the cross section of the tail section increases along its length, becoming substantially the same cross section as the tail socket. In this way, as at least one of the parts is rotated, the length of the tail section on each part passes through the socket of the other part and becomes more tightly fitted in the tail socket during rotation. When the tail section corresponds to the size of the tail socket, the parts are connected together and lateral movement of the parts is prevented.

Preferably, the tail section has a waist that corresponds to a catch, or catches, on the tail socket of the other part so that the tail section is connected within the channel defined by the tail socket and cannot be removed during rotation.

The tail section may be helical.

In some embodiments, the tail socket may be tapered to aid with receiving the tail section.

In some embodiments, contact surfaces of the tail section and tail socket that touch during connection of the parts may have serrations or teeth formed therein in order to provide a detent mechanism in the form of a rack-and-pinion during rotation. In some embodiments, the tail section and tail socket may connect by means of a ratchet mechanism to enable incremental connection. A ratchet lock may be provided to prevent accidental locking.

The tail socket is defined by the first face and the pin in order to define a region through which a tail section is received and can travel through.

In some embodiments, the pin is an integrated part of the body.

In some other embodiments, each part has a pin which is a separate component fitted during manufacture.

In a preferred embodiment, the pin is fitted to the body by being received in a recess. The recess receives a pin that is fitted by a tolerance fit and then is not removable.

Advantageously, the recess in which the pin is received assists with tooling by providing a hold point.

Preferably, the pin, the first face, or both the pin and the first face include at least one catch which acts to form a waist region that holds the tail section in the tail socket.

In some preferred embodiments, the catch may only be associated with the pin.

The catch or catches act to capture the tail section within the tail socket so that it cannot dislodge during rotation.

The method of connecting and disconnecting the two parts typically has three main stages. Firstly, the two parts are aligned by positioning the two first faces (engagement surfaces) adjacent one to another so that they abut.

Secondly, at least one part is rotated in a first direction with respect to the other part so that each tail section of each part enters a tail socket of the other part so that the parts are connected by two regions of connection.

The range of movement during which the parts are connected corresponds to the length of the tail sections. When the parts are rotated beyond this range, the parts can be separated as the parts are no longer connected by the tail section and tail socket, although the engagement surfaces of the two first faces may remain engaged.

It is appreciated that in some embodiments the length of the tail socket may also have an impact on the range of movement during which the parts are connected and the range of movement through which the parts are not connected. For example, in some embodiments the tail socket may be longer than the tail section, meaning that the length of the tail socket determines the range of movement through which there is connection between a tail section and tail socket.

Advantageously, the range of movement when the parts are connected may be limited to within 180 degrees so that minimal movement is required to connect and disconnect the parts. Preferably, the range during which the parts are connected is 110 to 170 degrees.

Thirdly, to disconnect connected parts, at least one of the parts is rotated in a second direction that is opposite to the first direction and the tail sections of each part travel through the tail sockets of each part until disconnected and thereby enabling the parts to be separated.

In preferred embodiments, the connecting head has an aperture through which a line or lanyard can be received. In this way, each part can be secured to a user, thereby preventing the parts from being dropped. The parts can be connected and disconnected whilst on a hook, carabiner, line, or lanyard.

Preferably, the aperture passes through the first and second faces and corresponds to the axis of rotation.

In preferred embodiments, the aperture is substantially central. It is appreciated that in some embodiments the aperture may be offset.

In some embodiments, the aperture may be reinforced, for example, to include a reinforced ring. For example, a metal ring may be inset within the connecting head.

In some embodiments, an aperture may be provided on the body as opposed to, or in addition to, on the connecting head.

In preferred embodiments, the parts that form the rotatable connector may be formed from a synthetic plastics material. It is appreciated that the parts may be formed from any material.

The body may be any object or a pair of different objects that are connected together by the connecting heads. It is appreciated that the body may be shaped into any form and some examples are provided below.

In a preferred embodiment, the body is a wedge so that a pair of wedges can be connected. In this way, two wedges can be carried together and separated for use when required or used together if a larger wedge is required. The wedge tapers from a proximal end of the body to a tip.

In some embodiments, the wedge may have a textured surface, for example having raised and lowered portions.

Preferably, at least one external face (an upper face or lower face) of the wedge is ridged to allow grip or bite when in use, for example, so that the wedge engages with a cut in a tree trunk to provide friction when forced into a cut.

In some embodiments, one surface of the wedge may include a scooped region which reduces tool time when being molded in production, thereby making production more efficient as well as reducing the amount of material required and thereby weight of the part.

In other embodiments, the body may be a rectangular plate, for example for use as a spacer, or levelling aid.

In yet further embodiments, the body may be a finishing tool, such as for caulk or silicone, and a user may carry two devices and be able to select the one required for the finish.

In another embodiment, the bodies may be keys so that a pair of different keys are connected.

In yet further embodiments, the body may be a tool such as a screwdriver, a knife such as a folding pocketknife, a pair of scissors, or a security key needing two operators. It is appreciated that a user may select two items they require and connect these together.

In some embodiments, the two bodies may be different complementary parts that are typically used together, for example a dustpan and brush set, items of cutlery such as salad cutlery or a knife and fork or measuring spoons.

In some embodiments, each part is a different color so that it is easy distinguish between the two parts. This may be of particular benefit when both parts are identical in shape.

Preferred embodiments of the invention will now be described, by way of example and with reference to the figures.

BRIEF DESCRIPTION OF THE DRAWINGS

FIG. 1A shows a rear isometric view of a first embodiment of a part;
FIG. 1B shows a front isometric view of a first embodiment of a part;
FIG. 1C shows a side view of a first embodiment of a part;
FIG. 1D shows a rear view of a first embodiment of a part;
FIG. 1E shows an opposite side view of the first embodiment shown in FIG. 1C;
FIG. 1F shows a front view of the first embodiment;
FIGS. 3A to 3C show various views of the pin;
FIGS. 4A to 4D show two parts through the stages of connection and disconnection.

DETAILED DESCRIPTION OF THE INVENTION

Figure 2:
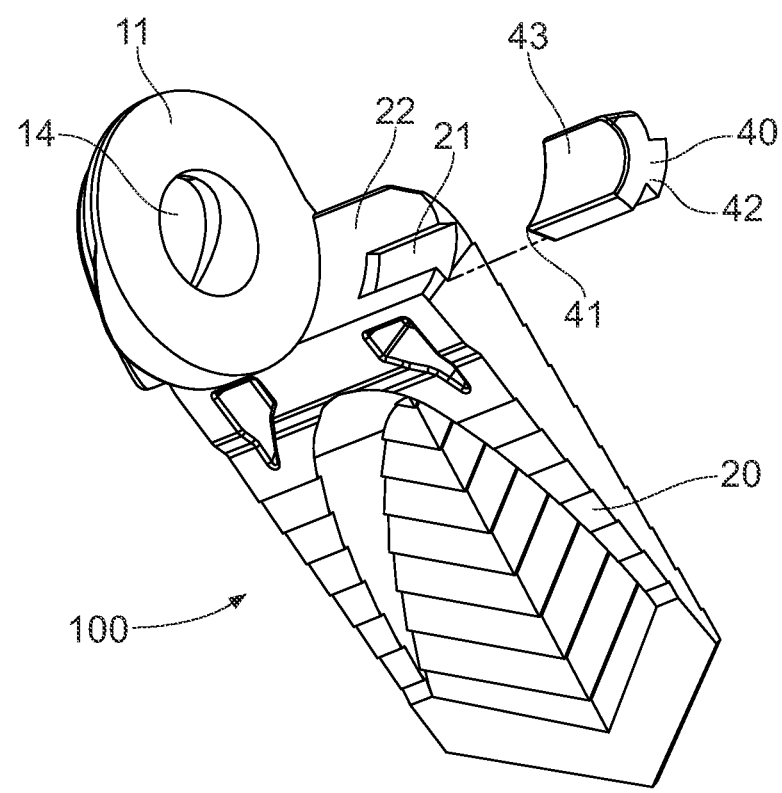
FIG. 2 shows an exploded view of the first embodiment.

FIGS. 1A to 3C show a preferred embodiment of the parts 100 that form the rotatable connector. The pictured connector 200 in FIG. 4A-4D is formed from two parts 100. Each part 100 has a connecting head 10 and a body 20.

The connecting head 10 is substantially ring shaped. The connecting head has a first face 11 that is planar and a second opposed face 12 that is contoured, providing a raised and lowered surface that defines the arcuate tail section 13 that connects with the tail socket 30.

The first faces 11 of the two parts 100 form the engagement surfaces. The first faces 11 of two parts 100 are positioned adjacent to one another so as to abut, and at least one of the parts is rotated to connect and disconnect the two parts by means of the tail sections and tail sockets.

In the pictured embodiment, the second face 12 includes a tail section 13 arranged on an outer perimeter edge of a segment of the connecting head 10. The tail section 13 is shaped and dimensioned to be received through a tail socket 30. The tail section is a contour on the contoured face 12 as the tail section has a profile that extends from the second face of the connecting head.

The tail section 13 is an arcuate portion that projects from and extends around part of the perimeter edge of the connecting head. The tail section 13 is received by a tail socket 30 that is defined between the first face 11 and a pin 40 extending from a proximal end of the body 20. The tail socket 30, in one example, is defined by a channel through which the tail section 13 can travel. A cross section of the tail section 13 corresponds to a cross section of the tail socket 30.

The tail section 13 is tapered along its length, starting from a narrow tip 13A, shown in FIG. 1F, to a wider section that corresponds to the size of the tail socket 30. In this way as the tail section 13 travels further along the channel of the tail socket 30, the tail section 13 connects fully in the socket 30 so that there is no lateral movement of one part relative to the other.

The connection of the two bodies 20 of each part 100 prevents further rotation and is the point at which both parts are connected together in the most compact configuration, as in FIG. 4D.

When the two parts 100 are connected and at least one part is rotated in a first direction relative to the other, the tail section 13 of first part travels through the tail socket 30 of the second part and the tail section 13 of the second part travels through the tail socket 30 of the first part so as to connect the two parts 100 together.

When at least one of the parts 100 is rotated in second directions relative to the other, the actions are reversed resulting in disconnection of the parts from each other.

The connecting head 10 has an aperture 14. The aperture 14 is for receiving a line or lanyard so that the rotatable connector can be secured to a user.

FIG. 2 shows the pin 40 exploded from the part 100. The pin 40 is manufactured separately to aid with tooling and is fitted into a recess 21 by an interference fit. The pin 40 has a plug 42 that is adapted to be received in the recess. The pin 40 is not intended to be removed once fitted.

The pin 40 has a catch 41 which acts to hold the tail section within the tail socket 30. The shoulder 22 (proximal end) of the body 20 is concave and the pin 40 is shaped 43 to correspond to the curvature, as in FIGS. 2 and 3A-C.

FIGS. 4A-D show the two parts 100 during the stages of connection and disconnection.

FIG. 4A shows the two parts 100 separately.

In FIG. 4B, the first faces 11 are aligned so that the engagement surface of the first faces 11 abut and are engaged. The tapered end 13A of the tail section 13 is aligned with and about to enter the tail socket 40, so the parts 100 are engaged but not yet connected.

In FIG. 4C, both bodies 20 have been rotated towards each other in the first direction so that the tail sections 13 are travelling along the tail sockets 30 to create a connection between the parts 100. The catches 41 on the pin 40 create a waist that prevents the tail sections from escaping from the tail socket 30.

The dashed lines 'A' and arrow in FIG. 4B indicate the range of movement during which the parts are connected. The preferred range is 110 to 170 degrees, and the range of connected movement corresponds to the length of the tail section 13. When the parts 100 are rotated beyond this range the parts are separate and not connected.

The invention has been described by way of examples only, and it will be appreciated that variation may be made to the above-mentioned embodiments without departing from the scope of protection as defined by the claims.

The invention claimed is:

1. A rotatable connector (200) formed from two parts (100), each part comprising: a body (20) extending from a connecting head (10), the bodies (20) of the two parts (100) being identical; wherein the connecting head (10) has a first face (11) and an opposed second face (12), characterized in that the second faces of each part (12) include an arcuate tail section (13) arranged on an outer perimeter edge of a segment of each connecting head (10) and each second face is shaped and dimensioned to be received through a tail socket (30) defined between the first face (11) and a pin (40) extending from a proximal end of the body (20); so that when the two first faces (11) abut each other, the two parts (100) are engaged as engaged parts (100) and the two connecting heads (10) are coaxial to define an axis of rotation, and when the engaged parts (100) are rotated relative one to another, the tail section (13) of the first part travels through the tail socket (30) of the second part and the tail section (13) of the second part travels through the tail socket (30) of the first part, thereby connecting the two parts (100) together; and when the two parts are rotated in an opposite direction, the two parts are disconnected one from the other.

2. A rotatable connector (200) according to claim 1 wherein the two parts (100) are identical.

3. A rotatable connector (200) according to claim 1 wherein the first face (11) is planar.

4. A rotatable connector (200) according to claim 1 wherein the connecting head (10) has an aperture (14) through which a hook, carabiner, line, or lanyard can be received.

5. A rotatable connector (200) according to claim 4 wherein the aperture (14) is substantially central.

6. A rotatable connector (200) according to claim 4 wherein the aperture (14) includes a reinforced ring.

7. A rotatable connector (200) according to claim 1 wherein the tail section (13) is tapered from a first end (13A) to a second end.

8. A rotatable connector (200) according to claim 7 wherein the tail socket (30) is tapered.

9. A rotatable connector (200) according to claim 1 formed from a synthetic plastics material.

10. A rotatable connector (200) according to claim 1 wherein contact surfaces of the tail section (13) and tail socket (30) have serrations or teeth formed therein in order to provide a detent mechanism in the form of a rack-and-pinion.

11. A method of connecting two parts (100) as described in claim 1 including the steps of positioning the two first faces (11) adjacent one to another so that they abut; and rotating at least one part in a first direction with respect to the other part so that the tail section (13) of each part enters the tail socket (30) of the other part.

12. A method of disconnecting two parts (100) as described in claim 11 having the steps of rotating at least one of the parts in a second direction that is opposite to the first direction so that the tail sections (13) of each part travel through the tail sockets (30) of each part until disconnected to separate the parts.

* * * * *